United States Patent
Jonishi et al.

(10) Patent No.: US 10,302,772 B2
(45) Date of Patent: May 28, 2019

(54) SCINTILLATOR PANEL AND RADIATION DETECTOR

(71) Applicant: HAMAMATSU PHOTONICS K.K., Hamamatsu-shi, Shizuoka (JP)

(72) Inventors: Hidenori Jonishi, Hamamatsu (JP); Yutaka Kusuyama, Hamamatsu (JP); Hirotake Osawa, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/755,129

(22) PCT Filed: Sep. 2, 2016

(86) PCT No.: PCT/JP2016/075817
§ 371 (c)(1),
(2) Date: Feb. 26, 2018

(87) PCT Pub. No.: WO2017/047411
PCT Pub. Date: Mar. 23, 2017

(65) Prior Publication Data
US 2018/0259655 A1    Sep. 13, 2018

(30) Foreign Application Priority Data

Sep. 15, 2015 (JP) ................................. 2015-181743

(51) Int. Cl.
*G01T 1/20* (2006.01)
*G21K 4/00* (2006.01)
*G01T 1/202* (2006.01)

(52) U.S. Cl.
CPC .............. *G01T 1/2002* (2013.01); *G01T 1/20* (2013.01); *G01T 1/2006* (2013.01);
(Continued)

(58) Field of Classification Search
CPC ........ G01T 1/2002; G01T 1/20; G01T 1/2006
See application file for complete search history.

(56) References Cited

U.S. PATENT DOCUMENTS

| 2012/0193543 A1* | 8/2012 | Kaneko | G01T 1/202 250/369 |
| 2014/0061481 A1* | 3/2014 | Kondo | G01T 1/202 250/361 R |
| 2016/0091615 A1* | 3/2016 | Peters | G01T 1/2002 250/336.1 |

FOREIGN PATENT DOCUMENTS

| JP | H05-196742 A | 8/1993 |
| JP | 2003-107197 A | 4/2003 |

(Continued)

OTHER PUBLICATIONS

International Preliminary Report on Patentability dated Mar. 29, 2018 for PCT/JP2016/075817.

*Primary Examiner* — Hugh Maupin
(74) *Attorney, Agent, or Firm* — Drinker Biddle & Reath LLP (57) ABSTRACT

A scintillator panel includes: a substrate that includes a principal surface and has transparency to the scintillation light; a scintillator layer that is disposed on the principal surface; a frame member that is disposed on the principal surface so as to surround the scintillator layer when viewed in a direction intersecting the principal surface; a protective layer that is disposed on the principal surface and the scintillator layer and is fixed to the frame member so as to seal the scintillator layer; a sheet-shaped optical functional layer that is disposed between the scintillator layer and the protective layer; and an elastic member that is interposed between the optical functional layer and the protective layer and is elastically deformed.

19 Claims, 8 Drawing Sheets

(52) U.S. Cl.
CPC .......... *G01T 1/2018* (2013.01); *G01T 1/2023* (2013.01); *G21K 4/00* (2013.01); *G21K 2004/02* (2013.01); *G21K 2004/10* (2013.01)

(56) References Cited

FOREIGN PATENT DOCUMENTS

| | | |
|---|---|---|
| JP | 2005-283483 | 10/2005 |
| JP | 2005-283486 A | 10/2005 |
| JP | 2007-57428 A | 3/2007 |
| JP | 2007-240306 A | 9/2007 |
| JP | 2008-170374 A | 7/2008 |
| JP | 2009-25258 A | 2/2009 |
| JP | 4293299 B2 | 7/2009 |
| JP | 4764407 B2 | 9/2011 |
| JP | 2012-127735 A | 7/2012 |
| JP | 2012-137438 A | 7/2012 |
| JP | 2014-052330 | 3/2014 |
| WO | WO-99/66352 A1 | 12/1999 |

* cited by examiner

SCINTILLATOR PANEL AND RADIATION DETECTOR

TECHNICAL FIELD

An aspect of the invention relates to a scintillator panel and a radiation detector.

BACKGROUND ART

Patent Literature 1 discloses an X-ray detector. The X-ray detector includes a photoelectric conversion substrate, a fluorescence conversion film formed on a surface of the photoelectric conversion substrate and a light reflecting layer formed on the photoelectric conversion substrate and the fluorescence conversion film. The fluorescence conversion film is formed with a columnar crystal structure in which a plurality of columnar crystals are formed in an in-plane direction of the photoelectric conversion substrate. The light reflecting layer seals the fluorescence conversion film by causing a peripheral portion thereof to adhere to the photoelectric conversion substrate. The light reflecting layer is formed of a mixture of an adhesive material having fluidity and a powder of an inorganic material having a higher refraction index than the adhesive material.

CITATION LIST

Patent Literature

Patent Literature 1: Japanese Unexamined Patent Publication No. 2009-25258

SUMMARY OF INVENTION

Technical Problem

The X-ray detector achieves prevention of deterioration of the fluorescence conversion film by blocking moisture using the light reflecting layer. The X-ray detector achieves improvement in X-ray resolution by preventing the light reflecting layer from permeating the fluorescence conversion film. However, the light reflecting layer is deformed so as to follow tips by flowing of the adhesive material and fills a space between the tips of neighboring columnar crystals. Depending on the magnitude of fluidity of the adhesive material, the light reflecting layer may also permeate between neighboring columnar crystals on a base side of the columnar crystals. In this case, there is concern that an X-ray resolution and an optical output will decrease due to leakage of visible light from the columnar crystals to the light reflecting layer.

An object of an aspect of the invention is to provide a scintillator panel and a radiation detector that can improve a resolution and an optical output.

Solution to Problem

According to an aspect of the invention, there is provided a scintillator panel that converts radiation into scintillation light, the scintillator panel including: a substrate that includes a principal surface and has transparency with respect to the scintillation light; a scintillator layer that is disposed on the principal surface; a frame member that is disposed on the principal surface so as to surround the scintillator layer when viewed in a direction intersecting the principal surface; a protective layer that is disposed on the principal surface and the scintillator layer and is fixed to the frame member so as to seal the scintillator layer; a sheet-shaped optical functional layer that is disposed between the scintillator layer and the protective layer; and an elastic member that is interposed between the optical functional layer and the protective layer and is elastically deformed, wherein a height of the frame member from the principal surface is larger than a height of the scintillator layer from the principal surface, wherein the scintillator layer includes a plurality of columnar crystals of a scintillator material, and wherein the optical functional layer is pressed to the scintillator layer by an elastic force of the elastic member and comes in contact with the scintillator layer in a plurality of regions including tips of the plurality of columnar crystals.

In the scintillator panel, the scintillator layer including a plurality of columnar crystals is disposed on the principal surface of the substrate and is sealed by the protective layer. The sheet-shaped optical functional layer is disposed between the scintillator layer and the protective layer, and the elastic member is disposed between the optical functional layer and the protective layer. The elastic member is interposed between the optical functional layer and the protective layer and is elastically deformed. The optical functional layer is pressed to the scintillator layer by the elastic force of the elastic member and comes in contact with the scintillator layer in a plurality of regions including the tips of the columnar crystals of the scintillator layer.

In this way, in the scintillator panel, the sheet-shaped optical functional layer is used. Accordingly, it is possible to prevent the optical functional layer from filling a gap between the tips of the neighboring columnar crystals or permeating between the columnar crystals. Since the optical functional layer is pressed to the scintillator layer by the elastic force of the elastic member, it is possible to prevent the optical functional layer from being separated from the tips of the columnar crystals. Accordingly, it is possible to prevent scintillation light from leaking from the columnar crystals. As a result, it is possible to improve a resolution and an optical output.

The protective layer is fixed to the frame member which is higher (thicker) than the scintillator layer. Accordingly, for example, by using the protective layer having a flat plate shape, a space corresponding to a difference in the height between the frame member and the scintillator layer is formed between the scintillator layer and the protective layer. Accordingly, by disposing the optical functional layer and the elastic member in the space, it is possible to easily and satisfactorily realize the above-mentioned configuration and thus to improve a resolution and an optical output.

In the scintillator panel according to the aspect of the invention, the elastic member may have a sheet shape extending along the principal surface. In this case, the elastic member may include foamed plastic. In this case, the optical functional layer can be pressed uniformly along the principal surface of the substrate using the elastic member.

In the scintillator panel according to the aspect of the invention, the elastic member may be formed integrally with the optical functional layer or the protective layer. In this case, the optical functional layer can be easily configured to be pressed to the scintillator layer using the elastic member.

In the scintillator panel according to the aspect of the invention, the tip of each columnar crystal may be flattened. Even when the tips of the columnar crystals are flattened in this way, the optical functional layer can be prevented from filling a gap between the tips of the neighboring columnar crystals or permeating between the columnar crystals, and thus it is possible to improve a resolution and an optical output.

According to another aspect of the invention, there is provided a radiation detector including: a substrate that includes a principal surface and a plurality of photoelectric conversion elements formed on the principal surface; a scintillator layer that is disposed on the photoelectric conversion elements and that converts radiation into scintillation light; a frame member that is disposed on the principal surface so as to surround the scintillator layer when viewed in a direction intersecting the principal surface; a protective layer that is disposed on the principal surface and the scintillator layer and is fixed to the frame member so as to seal the scintillator layer; a sheet shaped optical functional layer that is disposed between the scintillator layer and the protective layer; and an elastic member that is interposed between the optical functional layer and the protective layer and is elastically deformed, wherein a height of the frame member from the principal surface is larger than a height of the scintillator layer from the principal surface, wherein the scintillator layer includes a plurality of columnar crystals of a scintillator material, and wherein the optical functional layer is pressed to the scintillator layer by an elastic force of the elastic member and comes in contact with the scintillator layer in a plurality of regions including tips of the plurality of columnar crystals.

In the radiation detector, the scintillator layer including a plurality of columnar crystals is disposed on the principal surface of the substrate including a plurality of photoelectric conversion elements and is sealed by the protective layer. The sheet-shaped optical functional layer is disposed between the scintillator layer and the protective layer, and the elastic member is disposed between the optical functional layer and the protective layer. The elastic member is interposed between the optical functional layer and the protective layer and is elastically deformed. The optical functional layer is pressed to the scintillator layer by the elastic force of the elastic member and comes in contact with the scintillator layer in a plurality of regions including the tips of the columnar crystals of the scintillator layer.

In this way, in the radiation detector, the sheet-shaped optical functional layer is used. Accordingly, it is possible to prevent the optical functional layer from filling a gap between the tips of the neighboring columnar crystals or permeating between the columnar crystals. Since the optical functional layer is pressed to the scintillator layer by the elastic force of the elastic member, it is possible to prevent the optical functional layer from being separated from the tips of the columnar crystals. Accordingly, it is possible to prevent scintillation light from leaking from the columnar crystals. As a result, it is possible to improve a resolution and an optical output.

The protective layer is fixed to the frame member which is higher (thicker) than the scintillator layer. Accordingly, for example, by using the protective layer having a flat plate shape, a space corresponding to a difference in the height between the frame member and the scintillator layer is formed between the scintillator layer and the protective layer. Accordingly, by disposing the optical functional layer and the elastic member in the space, it is possible to easily and satisfactorily realize the above-mentioned configuration and thus to improve a resolution and an optical output.

In the radiation detector according to the aspect of the invention, the elastic member may have a sheet shape extending along the principal surface. In this case, the elastic member may include foamed plastic. In this case, the optical functional layer can be pressed uniformly along the principal surface of the substrate using the elastic member.

In the radiation detector according to the aspect of the invention, the elastic member may be formed integrally with the optical functional layer or the protective layer. In this case, the optical functional layer can be easily configured to be pressed to the scintillator layer using the elastic member.

In the radiation detector according to the aspect of the invention, the tip of each columnar crystal may be flattened. Even when the tips of the columnar crystals are flattened in this way, the optical functional layer can be prevented from filling a gap between the tips of the neighboring columnar crystals or permeating between the columnar crystals, and thus it is possible to improve a resolution and an optical output.

According to another aspect of the invention, there is provided a scintillator panel that converts radiation into scintillation light, the scintillator panel including: a substrate that includes a principal surface and has transparency with respect to the scintillation light; a scintillator layer that is disposed on the principal surface; a frame member that is disposed on the principal surface so as to surround the scintillator layer when viewed in a direction intersecting the principal surface; a protective layer that is disposed on the principal surface and the scintillator layer and is fixed to the frame member so as to seal the scintillator layer; and a hard optical functional layer that is formed integrally on a surface of the protective layer facing the scintillator layer, wherein a height of the frame member from the principal surface is larger than a height of the scintillator layer from the principal surface, wherein the scintillator layer includes a plurality of columnar crystals of a scintillator material, and wherein the optical functional layer is pressed to the scintillator layer in a state where the protective layer is fixed to the frame member and comes in contact with the scintillator layer in a plurality of regions including tips of the plurality of columnar crystals.

In the scintillator panel, the scintillator layer including a plurality of columnar crystals is disposed on the principal surface of the substrate and is sealed by the protective layer. The hard optical functional layer is formed integrally on the surface of the protective layer facing the scintillator layer. The optical functional layer is pressed to the scintillator layer in the state where the protective layer is fixed to the frame member. Accordingly, the optical functional layer comes in contact with the scintillator layer in a plurality of regions including the tips of the columnar crystals of the scintillator layer.

In this way, in the scintillator panel, the hard optical functional layer formed integrally with the protective layer is used. Accordingly, it is possible to prevent the optical functional layer from filling a gap between the tips of the neighboring columnar crystals or permeating between the columnar crystals. Since the optical functional layer is pressed to the scintillator layer by fixation to the protective layer, it is possible to prevent the optical functional layer from being separated from the tips of the columnar crystals. Accordingly, it is possible to prevent scintillation light from leaking from the columnar crystals. As a result, it is possible to improve a resolution and an optical output.

The protective layer is fixed to the frame member which is higher (thicker) than the scintillator layer. Accordingly, for example, by using the protective layer having a flat plate shape, a space corresponding to a difference in the height between the frame member and the scintillator layer is formed between the scintillator layer and the protective layer. Accordingly, by forming the optical functional layer along the space, it is possible to easily and satisfactorily realize the above-mentioned configuration and thus to improve a resolution and an optical output. The hard optical functional layer is an optical functional layer that is formed, for example, by curing a material including a resin and thus has hardness corresponding to hardness of a cured resin.

According to another aspect of the invention, there is provided a radiation detector including: a substrate that includes a principal surface and a plurality of photoelectric conversion elements formed on the principal surface; a scintillator layer that is disposed on the photoelectric conversion elements and that converts radiation into scintillation light; a frame member that is disposed on the principal surface so as to surround the scintillator layer when viewed in a direction intersecting the principal surface; a protective layer that is disposed on the principal surface and the scintillator layer and is fixed to the frame member so as to seal the scintillator layer; and a hard optical functional layer that is formed integrally on a surface of the protective layer facing the scintillator layer, wherein a height of the frame member from the principal surface is larger than a height of the scintillator layer from the principal surface, wherein the scintillator layer includes a plurality of columnar crystals of a scintillator material, and wherein the optical functional layer is pressed to the scintillator layer in a state where the protective layer is fixed to the frame member and comes in contact with the scintillator layer in a plurality of regions including tips of the plurality of columnar crystals.

In the radiation detector, the scintillator layer including a plurality of columnar crystals is disposed on the principal surface of the substrate including a plurality of photoelectric conversion elements and is sealed by the protective layer. The hard optical functional layer is formed integrally on the surface of the protective layer facing the scintillator layer. The optical functional layer is pressed to the scintillator layer in the state where the protective layer is fixed to the frame member. Accordingly, the optical functional layer comes in contact with the scintillator layer in a plurality of regions including the tips of the columnar crystals of the scintillator layer.

In this way, in the radiation detector, the hard optical functional layer formed integrally with the protective layer is used. Accordingly, it is possible to prevent the optical functional layer from filling a gap between the tips of the neighboring columnar crystals or permeating between the columnar crystals. Since the optical functional layer is pressed to the scintillator layer by fixation to the protective layer, it is possible to prevent the optical functional layer from being separated from the tips of the columnar crystals. Accordingly, it is possible to prevent scintillation light from leaking from the columnar crystals. As a result, it is possible to improve a resolution and an optical output.

The protective layer is fixed to the frame member which is higher (thicker) than the scintillator layer. Accordingly, for example, by using the protective layer having a flat plate shape, a space corresponding to a difference in the height between the frame member and the scintillator layer is formed between the scintillator layer and the protective layer. Accordingly, by forming the optical functional layer along the space, it is possible to easily and satisfactorily realize the above-mentioned configuration and thus to improve a resolution and an optical output.

Advantageous Effects of Invention

According to the aspects of the invention, it is possible to provide a scintillator panel and a radiation detector that can improve a resolution and an optical output.

DESCRIPTION OF EMBODIMENTS

Hereinafter, an embodiment of an aspect of the invention will be described in detail with reference to the accompanying drawings. In the drawings, the same or corresponding elements will be referenced by the same reference signs and repeated description thereof will be omitted.

A scintillator panel according to an embodiment serves to convert radiation such as X-rays into scintillation light such as visible light. The scintillator panel according to the following embodiment can be used, for example, as a radiation imaging device in a mammography device, a mass chest diagnostic device, a CT device, a dental oral imaging device, or a radiographic camera.

Figure 1:
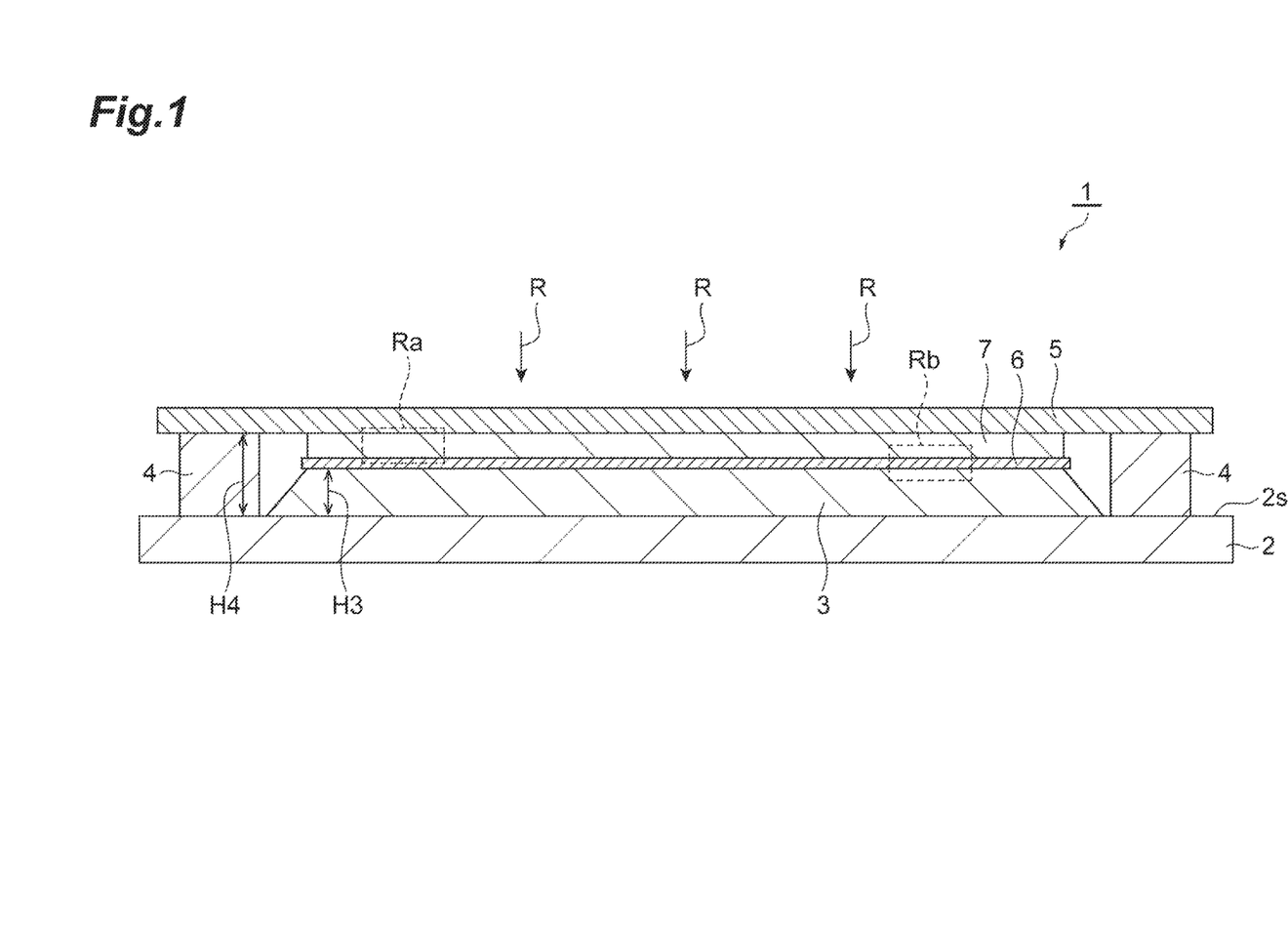
FIG. 1 is a sectional view of a scintillator panel according to an embodiment.
Figure 2:
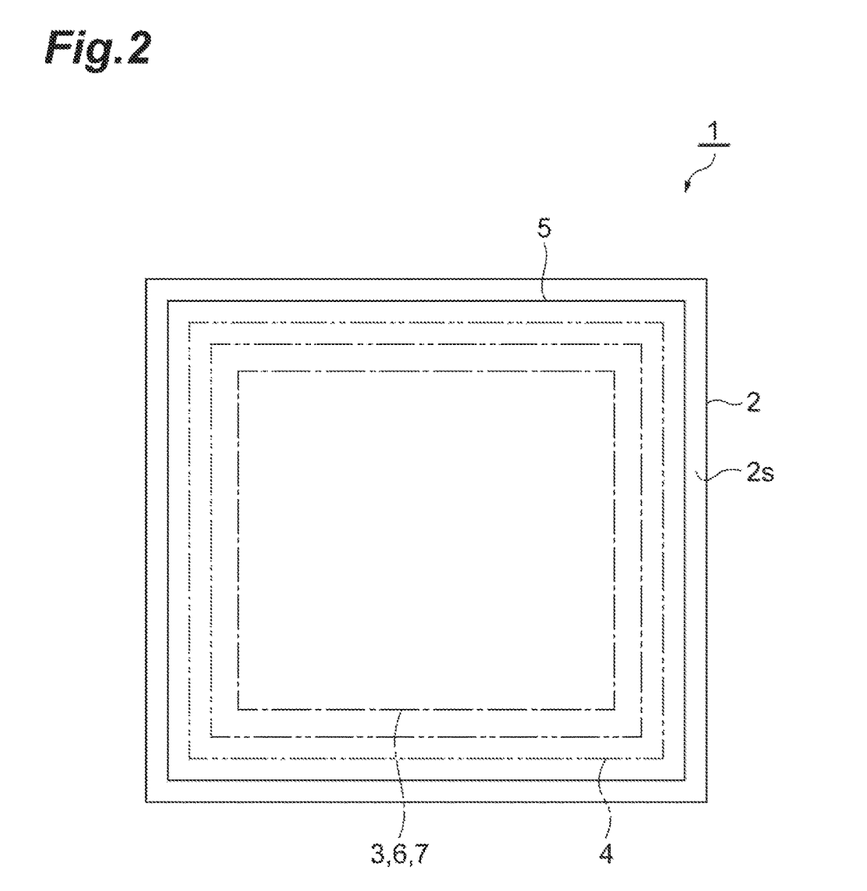
FIG. 2 is a plan view of the scintillator panel illustrated in FIG. 1.

FIG. 1 is a sectional view of the scintillator panel according to this embodiment. FIG. 2 is a plan view of the scintillator panel illustrated in FIG. 1. As illustrated in FIGS. 1 and 2, the scintillator panel 1 includes a substrate 2, a scintillator layer 3, a frame member 4, a protective layer 5, an optical functional layer 6, and an elastic member 7.

The substrate 2 includes a principal surface 2s. The substrate 2 has, for example, a rectangular plate shape. The substrate 2 has transparency with respect to scintillation light which is generated in the scintillator layer 3. The thickness of the substrate 2 is, for example, about 2.0 mm. The substrate 2 is formed of, for example, a fiber optic plate (FOP: an optical device formed by binding a plurality of optical fibers (for example, J5734 made by Hamamatsu Photonics K.K.)).

The scintillator layer 3 generates scintillation light such as visible light in response to incidence of radiation R such as X-rays. The scintillator layer 3 is disposed on the principal surface 2s of the substrate 2. For example, the scintillator layer 3 is formed in a rectangular area of the principal surface 2s when viewed from a direction intersecting (for example, perpendicular to) the principal surface 2s. An outer edge portion of the scintillator layer 3 has an inclined portion such that the thickness of the scintillator layer 3 decreases from the center of the scintillator layer 3 to the edge. Accordingly, a sectional shape of the scintillator layer 3 as a whole is, for example, a trapezoidal shape.

The thickness of the scintillator layer 3 (the thickness other than the inclined portion) is, for example, about 600 μm. The scintillator layer 3 includes a plurality of columnar crystals 30 of a scintillator material (see FIG. 3(b)). The scintillator material is, for example, a material containing CsI as a major component such as CsI:Tl. The scintillator layer 3 is formed, for example, by causing the columnar crystals 30 to grow on the principal surface 2s of the substrate 2 using a vacuum deposition method or the like.

The frame member 4 is disposed on the principal surface 2s so as to surround the scintillator layer 3 when viewed from a direction intersecting the principal surface 2s of the substrate 2. The frame member 4 has, for example, a rectangular ring shape. The height H4 of the frame member 4 from the principal surface 2s is larger than the height H3 (thickness) of the scintillator layer 3 from the principal surface 2s. The frame member 4 is interposed between the principal surface 2s and the protective layer 5 and causes the principal surface 2s and the protective layer 5 to adhere to each other. The principal surface 2s, the frame member 4, and the protective layer 5 form a space in which the scintillator layer 3, the optical functional layer 6, and the elastic member 7 are disposed. The frame member 4 is bonded to the principal surface 2s and the protective layer 5 so as to at least liquid-tightly (and air-tightly) seal the space. The frame member 4 is formed of, for example, a resin having low moisture permeability such as an epoxy resin.

The protective layer 5 is disposed on the principal surface 2s and the scintillator layer 3. The protective layer 5 is disposed so as to cover the scintillator layer 3 and the frame member 4 when viewed from the direction intersecting the principal surface 2s. The protective layer 5 has, for example, a rectangular flat plate shape extending along the principal surface 2s. The protective layer 5 transmits radiation R. For example, the thickness of the protective layer 5 ranges from 0.5 mm to 2.0 mm. The protective layer 5 is, for example, a glass plate of chemically reinforced glass. As described above, the protective layer 5 is fixed (bonded) to the frame member 4 so as to at least fluid-tightly seal the scintillator layer 3. Moisture-proofing of the scintillator layer 3 is realized by this sealing structure.

The optical functional layer 6 is disposed between the scintillator layer 3 and the protective layer 5. The optical functional layer 6 has a sheet shape. That is, the optical functional layer 6 does not have fluidity. For example, the optical functional layer 6 has a rectangular sheet shape extending along the principal surface 2s. The optical functional layer 6 covers the scintillator layer 3 when viewed from the direction intersecting the principal surface 2s. The optical functional layer 6 transmits radiation R. The optical functional layer 6 is, for example, a light reflecting layer that reflects scintillation light generated in the scintillator layer 3 or a light absorbing layer that absorbs the scintillation light. The thickness of the optical functional layer 6 is, for example, about 100 μm. The optical functional layer 6 can include a layer formed of a pigment and a binder resin. The optical functional layer 6 is, for example, a PET film.

The elastic member (elastic layer) 7 is disposed between the optical functional layer 6 and the protective layer 5. The elastic member 7 has, for example, a sheet shape extending along the principal surface 2s. The elastic member 7 is disposed on the optical functional layer 6 so as to cover at least the scintillator layer 3 when viewed from the direction intersecting the principal surface 2s. The elastic member 7 transmits radiation R. The elastic member 7 is interposed between the optical functional layer 6 and the protective layer 5 and is elastically deformed (that is, is compressed in the direction intersecting the principal surface 2s). Accordingly, the elastic member 7 presses the optical functional layer 6 to the scintillator layer 3 by an elastic force thereof. That is, the elastic member 7 is a pressure applying layer that applies a pressure to the optical functional layer 6.

For example, the thickness of the elastic member 7 ranges from 100 μm to 1000 μm. The material of the elastic member 7 is, for example, a plastic such as a polyethylene, a urethane resin, or a melamine resin, a rubber, or a silicone gel. For example, the elastic member 7 is a foamed plastic sheet formed by foaming the plastic, a urethane mat (a urethane resin sheet), a silicon gel sheet, a melamine sponge sheet, or a sheet-shaped bubble buffer material.

Figure 3:
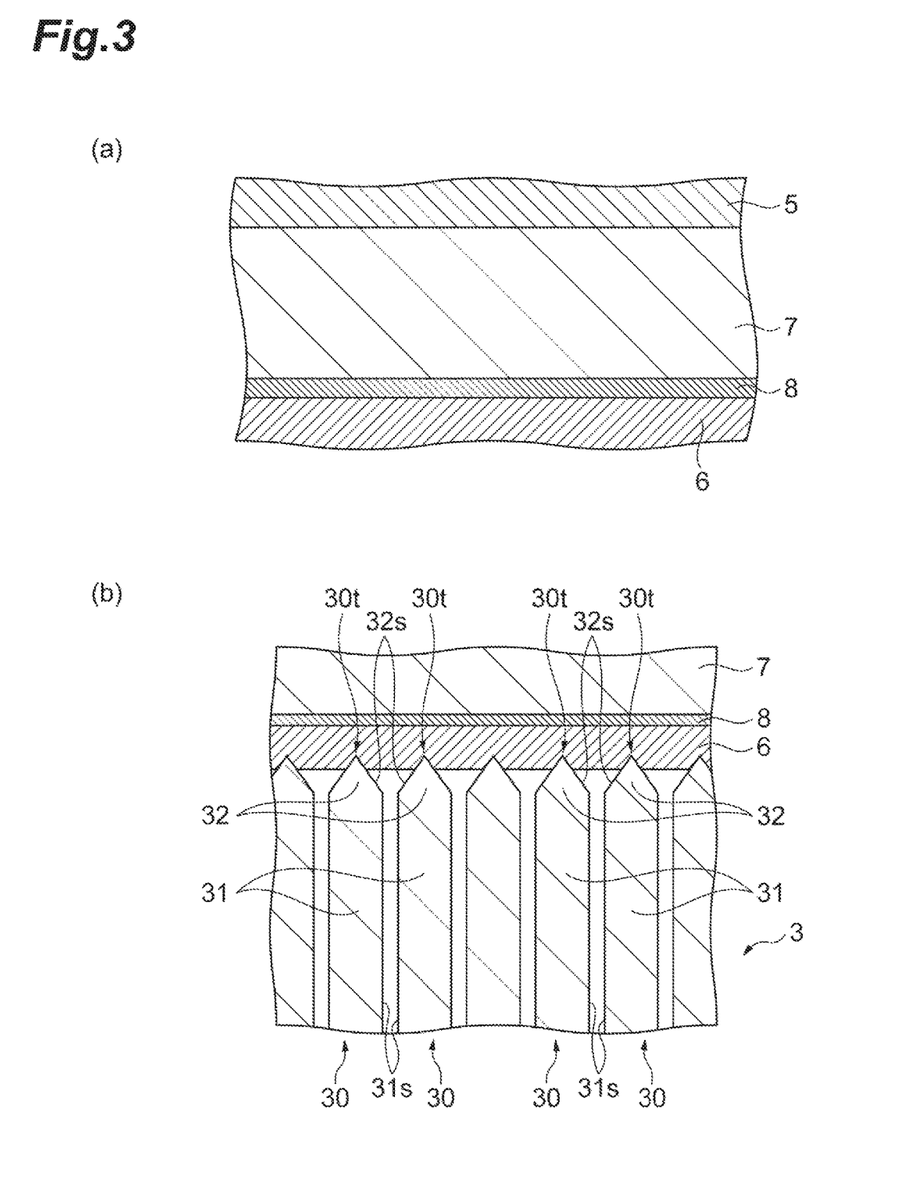
FIG. 3 is an enlarged sectional view illustrating a part of the scintillator panel illustrated in FIG. 1.

FIG. 3 is an enlarged sectional view illustrating a part of the scintillator panel illustrated in FIG. 1. FIG. 3(a) illustrates an area Ra in FIG. 1 and FIG. 3(b) illustrates an area Rb in FIG. 1. As illustrated in FIG. 3, the elastic member 7 is bonded to the optical functional layer 6 by an adhesive layer 8 and is integrated with the optical functional layer 6. The adhesive layer 8 is, for example, a resin having adhesiveness.

The columnar crystals 30 of the scintillator layer 3 are bonded to the principal surface 2s of the substrate 2 at bases thereof. Each columnar crystal 30 includes a columnar portion 31 and a tapered portion 32. The columnar portion 31 includes a base on the principal surface 2s side of the columnar crystal 30. The columnar portion 31 extends in the direction intersecting the principal surface 2s from the principal surface 2s.

The tapered portion 32 includes a tip 30t of the columnar crystal 30. The tapered portion 32 is formed integrally with the columnar portion 31. The tapered portion 32 has a tapered shape which is reduced as it goes away from the principal surface 2s. The sectional shape of the tapered portion 32 is, for example, a triangular shape. The columnar crystals 30 are separated from each other. That is, a gap is formed between neighboring columnar crystals 30. More specifically, between the neighboring columnar crystals 30, a gap is formed between side surfaces 31s of the columnar portions 31 and between side surfaces 32s of the tapered portions 32.

As described above, the elastic member 7 presses the optical functional layer 6 to the scintillator layer 3 by an elastic force thereof. That is, the optical functional layer 6 is pressed by the elastic force of the elastic member 7 and comes in contact with the scintillator layer 3. Here, the optical functional layer 6 comes in contact with the tips 30t of the plurality of columnar crystals 30. The tips 30t of the columnar crystals 30 are separated and independent from each other. Accordingly, the optical functional layer 6 comes in contact with the scintillator layer 3 in a plurality of independent areas including the tips 30t of the plurality of columnar crystals 30 (that is, comes in contact at multiple points).

On the other hand, the optical functional layer 6 does not fill the gaps between the neighboring columnar crystals 30. In other words, the optical functional layer 6 comes in contact with the scintillator layer 3 so as to maintain the gaps between the neighboring columnar crystals 30. More specifically, the sheet-shaped optical functional layer 6 is deformed to follow the shapes of the tips 30t of the columnar crystals 30, but comes in contact with only a part of the side surfaces 32s of the tapered portions 32 on the tip 30t side. Accordingly, most of the side surface 32s of each tapered portion 32 on the columnar portion 31 side does not come in contact with the optical functional layer 6 and contact with an air layer having a lower refraction index than the optical functional layer 6 and the scintillator layer 3 is maintained. The optical functional layer 6 does not permeate the gaps between the side surfaces 31s of the columnar portions 31. Accordingly, the overall side surface 31s of each columnar portion 31 does not come in contact with the optical functional layer 6 and contact with an air layer is maintained.

On the other hand, for example, when the optical functional layer is fat iced by applying a material having fluidity (a liquid-phase material) onto the scintillator layer 3, the optical functional layer fills the gaps between the side surfaces 32s of the tapered portions 32 and permeates the gaps between the side surfaces 31s of the columnar portions 31. Accordingly, the entire side surface 32s of each tapered portion 32 and at least a part of the side surface 31s of each columnar portion 31 comes in contact with the optical functional layer having a higher refraction index than the air layer.

As described above, in the scintillator panel 1, the scintillator layer 3 including a plurality of columnar crystals 30 is disposed on the principal surface 2s of the substrate 2 and is sealed by the protective layer 5 and the frame member 4. The sheet-shaped optical functional layer 6 is disposed between the scintillator layer 3 and the protective layer 5. The elastic member 7 is disposed between the optical functional layer 6 and the protective layer 5. The elastic member 7 is interposed between the optical functional layer 6 and the protective layer 5 and is elastically deformed (compressed). The optical functional layer 6 is pressed to the scintillator layer 3 by the elastic force of the elastic member 7. Accordingly, the optical functional layer 6 comes in contact with the scintillator layer 3 in a plurality of independent regions including the tips 30t of the columnar crystals 30.

In this way, in the scintillator panel 1, the sheet-shaped optical functional layer 6 is used. Accordingly, it is possible to prevent the optical functional layer 6 from filling the gap between the tapered portions 32 of the neighboring columnar crystals 30 or permeating the gaps between the columnar portions 31 of the columnar crystals 30. Since the optical functional layer 6 is pressed to the scintillator layer 3 by the elastic force of the elastic member 7, it is possible to prevent the optical functional layer 6 from being separated from the tips 30t of the columnar crystals 30. Accordingly, it is possible to prevent scintillation light from leaking from the columnar crystals 30. As a result, it is possible to improve a resolution and an optical output.

The protective layer 5 is fixed to the frame member 4 which is higher (thicker) than the scintillator layer 3. Accordingly, for example, by using the protective layer 5 having a flat plate shape, a space formed by a difference in the height between the frame member 4 and the scintillator layer 3 is formed between the scintillator layer 3 and the protective layer 5. Accordingly, by disposing the optical functional layer 6 and the elastic member 7 in the space, it is possible to easily and satisfactorily realize the above-mentioned configuration and thus to improve a resolution and an optical output.

In the scintillator panel 1, the elastic member 7 may have a sheet shape extending along the principal surface 2s of the substrate 2. In this case, the elastic member 7 may include, for example, foamed plastic. In this case, the optical functional layer 6 can be pressed uniformly along the principal surface 2s using the elastic member 7.

In the scintillator panel 1, the elastic member 7 is formed integrally with the optical functional layer 6. Accordingly, the optical functional layer 6 can be easily configured to be pressed to the scintillator layer 3 using the elastic member 7.

The thickness of the elastic member 7 can be set, for example, to range from 100 μm to 1000 μm. When the thickness of the elastic member 7 is equal to or greater than 100 μm, an elastic force sufficient for pressing the optical functional layer 6 to the scintillator layer 3 to come in contact with the scintillator layer 3 can be obtained. When the thickness of the elastic member 7 is equal to or less than 1000 μm, it is possible to prevent an increase in size (an increase in thickness) of the scintillator panel 1. That is, when the thickness of the elastic member 7 is set to range from 100 μm to 1000 μm, a decrease in size (suppression of an increase in thickness) of the scintillator panel 1 and improvement of a resolution and an optical output can be made to coexist.

Figure 4:
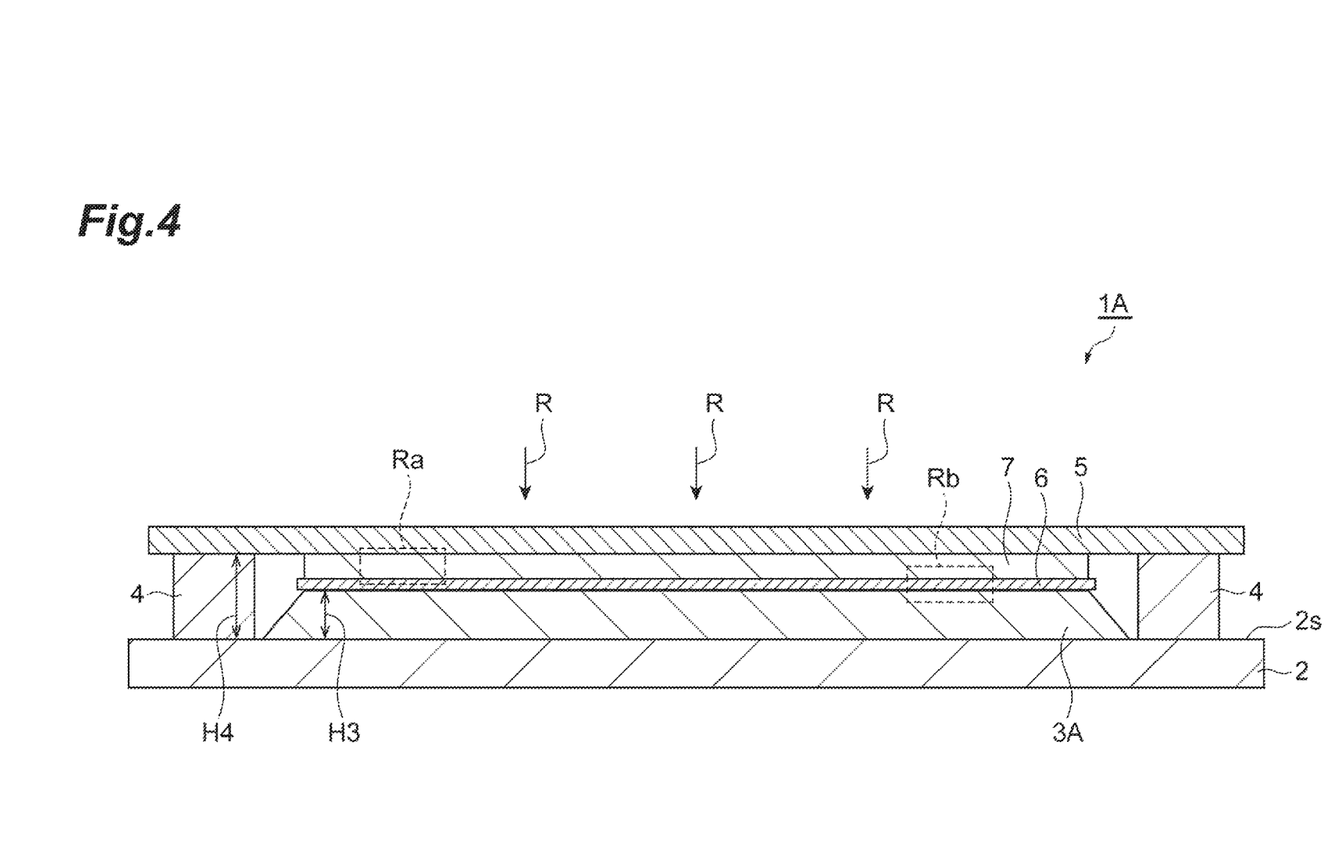
FIG. 4 is a sectional view of a scintillator panel according to a modified example.
Figure 5:
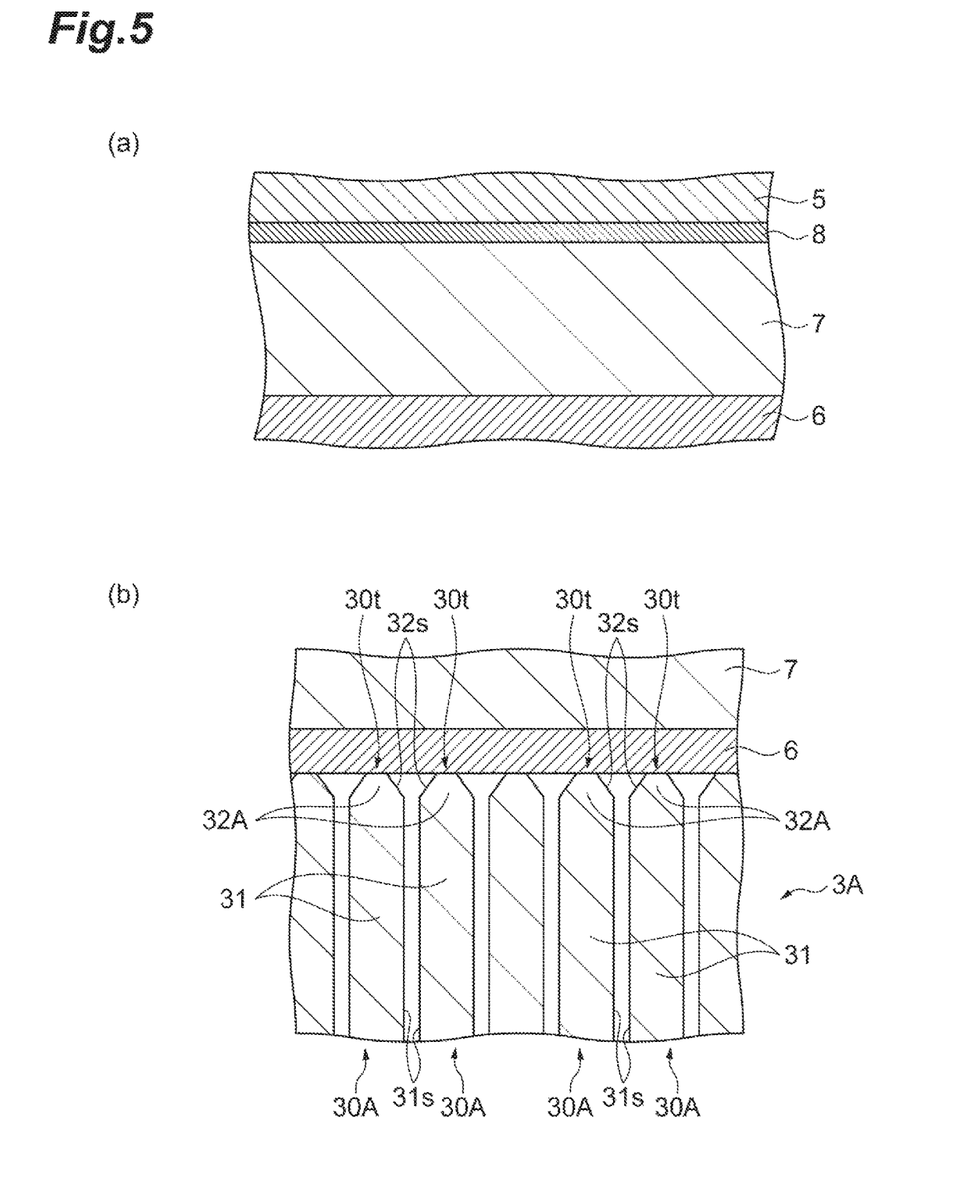
FIG. 5 is an enlarged sectional view illustrating a part of the scintillator panel illustrated in FIG. 14.

FIG. 4 is a sectional view of a scintillator panel according to a modified example. FIG. 5 is an enlarged sectional view illustrating a part of the scintillator panel illustrated in FIG. 4. FIG. 5(a) illustrates an area Ra in FIG. 4. FIG. 5(b) illustrates an area Rb in FIG. 4. As illustrated in FIGS. 4 and 5, the scintillator panel 1A is different from the scintillator panel 1, in that a scintillator layer 3A is provided instead of the scintillator layer 3 and the elastic member 7 is integrated with the protective layer 5.

The scintillator layer 3A is different from the scintillator layer 3, in that columnar crystals 30A are included instead of the columnar crystals 30. The columnar crystals 30A are different from the columnar crystals 30, in that a tapered portion 32A is provided instead of the tapered portion 32. Each tapered portion 32A includes a tip 30t. The tapered portion 32A is integrally formed with the columnar portion 31. The tapered portion 32A has a tapered shape which is reduced as it is separated away from the principal surface 2s. A sectional shape of the tapered portion 32A is, for example, trapezoidal shape.

Here, the tips 30t of the columnar crystals 30A are flattened, for example, by at least one of a pressurizing process, a heating process, an energy ray irradiation process of a laser beam or the like, and a grind process. That is, the tip 30t of each columnar crystal 30A is a flat surface which is defined by an edge portion of the side surface 32s of the tapered portion 32A.

The elastic member 7 is bonded to the protective layer 5 by the adhesive layer 8 and is integrated with the protective layer 5. The optical functional layer 6 is pressed by the elastic force of the elastic member 7 and comes in contact with the scintillator layer 3A. Here, the optical functional layer 6 comes in contact with the tips 30t of the plurality of columnar crystals 30A. That is, the optical functional layer 6 comes in contact with the scintillator layer 3A in a plurality of independent flat regions including the tips 30t of the plurality of columnar crystals 30A (that is, comes in contact at multiple points).

Here, the optical functional layer 6 does not fill the gaps between the neighboring columnar crystals 30A. That is, the optical functional layer 6 comes in contact with the scintillator layer 3A so as to maintain the gaps between the neighboring columnar crystals 30A. More specifically, the optical functional layer 6 comes in contact with only the flat surface (the tips 30t) which is defined the side surface 32s of the tapered portion 32A. Accordingly, the most part of the side surface 32s of each tapered portion 32A does not come in contact with the optical functional layer 6 and contact with an air layer having a lower refraction index than the optical functional layer 6 and the scintillator layer 3A is maintained. The optical functional layer 6 does not permeate the gaps between the side surfaces 31s of the columnar portions 31. Accordingly, the overall side surface 31s of each columnar portion 31 does not come in contact with the optical functional layer 6 and maintains contact with an air layer.

In this way, even when the tips 30t of the columnar crystals 30A are flattened, similarly to the scintillator panel 1, it is possible to improve a resolution and an optical output by employing the configuration in which the sheet-shaped optical functional layer 6 is pressed to the scintillator layer 3A and comes in contact with the scintillator layer 3A by the elastic force of the elastic member 7.

In the scintillator panel 1A, the elastic member 7 is teamed integrally with the protective layer 5. Accordingly, the optical functional layer 6 can be easily configured to be pressed to the scintillator layer 3A using the elastic member 7.

In the above-embodiment, an example of the scintillator panel according to an aspect of the invention has been described. Accordingly, the aspect of the invention is not limited to the scintillator panels 1 and 1A. In the aspect of the invention, the scintillator panels 1 and 1A can be arbitrarily modified or be applied to another configuration without changing the gist of the appended claims.

Figure 6:
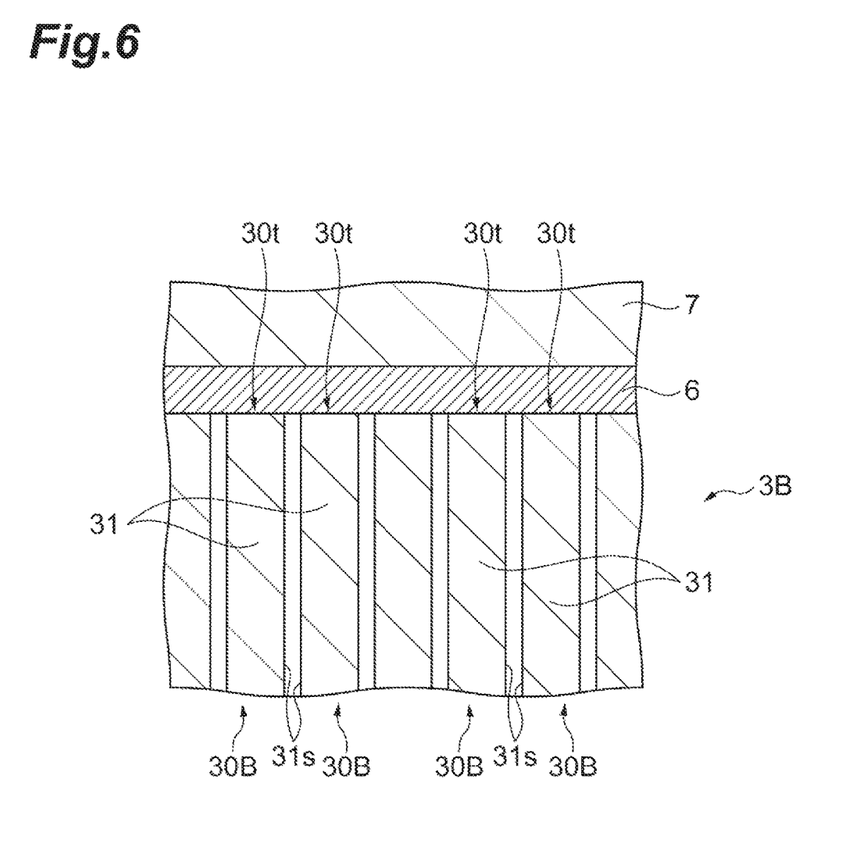
FIG. 6 is a sectional view illustrating a modified example of a scintillator layer.

For example, as illustrated in FIG. 6, in the scintillator panel 1, a scintillator layer 3B can be used instead of the scintillator layer 3. The scintillator layer 3B is different from the scintillator layer 3, in that columnar crystals 30B are provided instead of the columnar crystals 30. The columnar crystal 30B is different from the columnar crystal 30, in that the tip 30t is flattened. The columnar crystal 30B is formed by flattening the tip 30t so as to remove the entire tapered portion 32 of the columnar crystal 30. That is, the columnar crystal 30B includes only the columnar portion 31.

In this case, the sheet-shaped optical functional layer 6 is pressed by the elastic force of the elastic member 7 and comes in contact with only flat surfaces (the tips 30t) which are defined by edges of the side surfaces 31s of the columnar portions 31. Accordingly, similarly to a case in which the scintillator layer 3 is used, it is possible to improve a resolution and an optical output.

In the scintillator panel 1, similarly to the scintillator panel 1A, the elastic member 7 may be integrated with the protective layer 5. In the scintillator panel 1A, similarly to the scintillator panel 1, the elastic member 7 may be integrated with the optical functional layer 6. In the scintillator panel 1A, the scintillator layer 3B can be used instead of the scintillator layer 3A.

Figure 7:
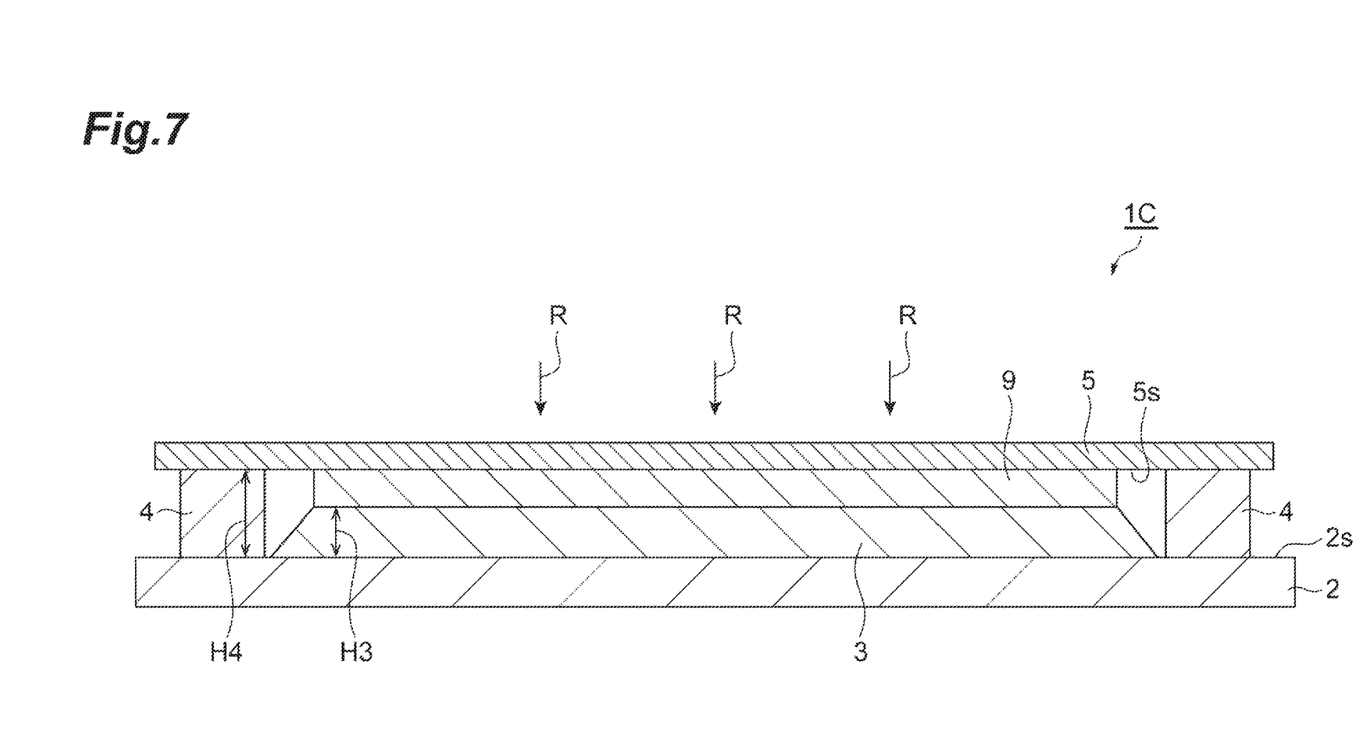
FIG. 7 is a sectional view illustrating a modified example of the scintillator panel.

Here, the scintillator panel according to the aspect of the invention can be applied as a scintillator panel 1C illustrated in FIG. 7. The scintillator panel 1C is different from the scintillator panel 1, in that an optical functional layer 9 is provided instead of the optical functional layer 6 and the elastic member 7 is not provided.

The optical functional layer 9 is disposed between the scintillator layer 3 and the protective layer 5. The optical functional layer 9 is formed on a surface 5s of the protective layer 5 facing the scintillator layer 3. The optical functional layer 9 can be formed, for example, by disposing a resin layer formed of a pigment and a binder resin having optical functions such as reflection or absorption on the surface 5s of the protective layer 5 and drying and curing the resin layer. Accordingly, the optical functional layer 9 is hard. That is, the optical functional layer 9 does not have fluidity. The optical functional layer 9 is forming integrally with the surface 5s of the protective layer 5. The hard optical functional layer 9 is an optical functional layer that has hardness corresponding to the hardness of the resin cured by curing a material including a resin to form the optical functional layer as described above.

The optical functional layer 9 is pressed to the scintillator layer 3 in a state where the protective layer 5 is fixed to the frame member 4 (by fixing the protective layer to the frame member). Accordingly, the optical functional layer 9 comes in contact with the scintillator layer 3. Particularly, the optical functional layer 9 comes in contact with the scintillator layer 3 (that is, comes in contact at multiple points) in a plurality of independent regions including the tips 30t of the plurality of columnar crystals 30.

As described above, in the scintillator panel 1C, the hard optical functional layer 9 is integrally formed on the surface 5s of the protective layer 5 facing the scintillator layer 3. The optical functional layer 9 is interposed between the protective layer 5 and the scintillator layer 3 and is pressed to the scintillator layer 3 in the state where the protective layer 5 is fixed to the frame member 4. Accordingly, the optical functional layer 9 comes in contact with the scintillator layer 3 in a plurality of regions including the tips 30t of the columnar crystals 30 of the scintillator layer 3.

In this way, in the scintillator panel 1C, the hard optical functional layer 9 formed integrally with the protective layer 5 is used. Accordingly, it is possible to prevent the optical functional layer 5 from filling the gap between the tips 30t of the neighboring columnar crystals 30 or permeating the space between the columnar crystals 30. Since the optical functional layer 9 is pressed to the scintillator layer 3 by fixation to the protective layer 5, it is possible to prevent the optical functional layer 9 from being separated from the tips 30t of the columnar crystals 30. Accordingly, it is possible to prevent scintillation light from leaking from the columnar crystals 30. As a result, it is possible to improve a resolution and an optical output. That is, the same characteristics as in the combination of the protective layer 5, the optical functional layer 6, and the elastic member 7 can be obtained in the protective layer 5 and the optical functional layer 9.

In the scintillator panel 1C, the scintillator layer 3A or the scintillator layer 3B may be used instead of the scintillator layer 3.

In the embodiment, a case in which the aspect of the invention is applied to the scintillator panel (for example, the scintillator panels 1, 1A, and 1C) has been described. With such a scintillator panel, a radiation detector can be constructed by using a sensor panel having photoelectric conversion elements (for example, a TFT panel or a CMOS image sensor panel) as a substrate. An example of the radiation detector will be described below.

Figure 8:
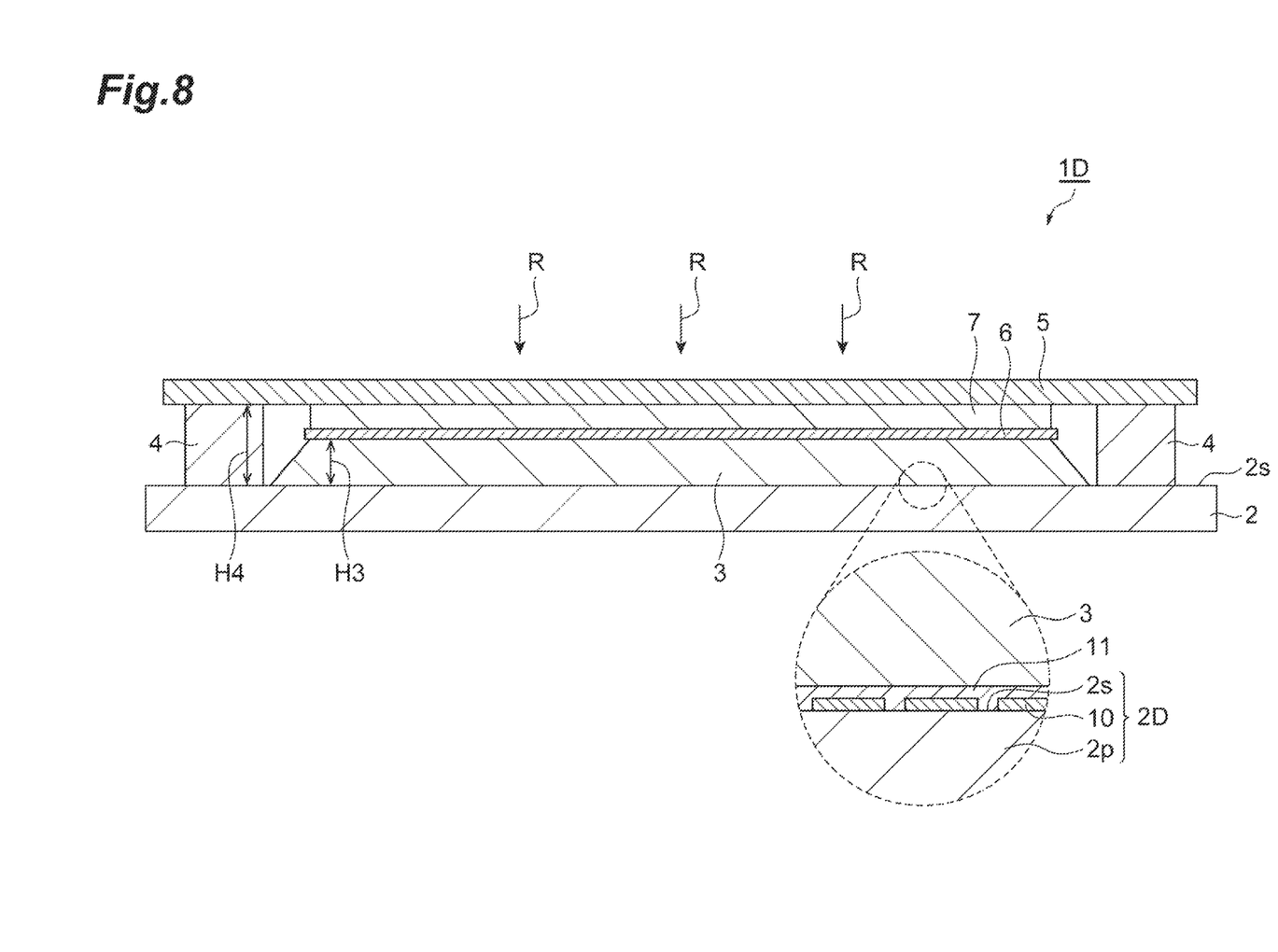
FIG. 8 is a sectional view of a radiation detector according to the embodiment.

FIG. 8 is a sectional view of a radiation detector according to the embodiment. As illustrated in FIG. 8, a radiation detector 1D is different from the scintillator panel 1, in that a substrate 2D which is a sensor panel is provided instead of the substrate 2. The substrate (sensor panel) 2D includes a principal surface 2s and a plurality of photoelectric conversion elements 10 formed on the principal surface 2s. More specifically, the substrate 2D includes a plate-shaped base portion 2p including the principal surface 2s. The photoelectric conversion elements 10 are two-dimensionally arranged along the principal surface 2s.

The scintillator layer 3 is for lied on the principal surface 2s and the photoelectric conversion elements 10, for example, by deposition. Here, a film portion 11 such as a passivation film or a planarization film is fortified on the principal surface 2s and the photoelectric conversion elements 10. The scintillator layer 3 is disposed on the principal surface 2s and the photoelectric conversion elements 10 with the film portion 11 interposed therebetween. The scintillator layer 3 is optically coupled to the photoelectric conversion elements 10. Accordingly, the photoelectric conversion elements 10 receives scintillation light generated in the scintillator layer 3 and outputs an electric signal corresponding to the scintillation light. The electric signal is taken out by a wire or the like which is not illustrated. Accordingly, the radiation detector 1D detects radiation R.

The radiation detector 1D achieves the same advantages as the advantages achieved by the scintillator panel 1. More specifically, in the radiation detector 1D, the scintillator layer 3 including a plurality of columnar crystals 30 is disposed on the principal surface 2s of the substrate 2D including a plurality of photoelectric conversion elements 10 and is sealed by the protective layer 5. The sheet-shaped optical functional layer 6 is disposed between the scintillator layer 3 and the protective layer 5, and the elastic member 7 is disposed between the optical functional layer 6 and the protective layer 5. The elastic member 7 is interposed between the optical functional layer 6 and the protective layer 5 and is elastically deformed. The optical functional layer 6 is pressed to the scintillator layer 3 by the elastic force of the elastic member 7 and comes in contact with the scintillator layer 3 in a plurality of regions including the tips 30t of the columnar crystals 30 of the scintillator layer 3.

In this way, in the radiation detector 1D, the sheet-shaped optical functional layer 6 is used. Accordingly, it is possible to prevent the optical functional layer 6 from filling the gaps between the tapered portions 32 of the neighboring columnar crystals 30 or permeating spaces between the columnar portions 31 of the columnar crystals 30. Since the optical functional layer 6 is pressed to the scintillator layer 3 by the elastic force of the elastic member 7, it is possible to prevent the optical functional layer 6 from being separated from the tips 30t of the columnar crystals 30. Accordingly, it is possible to prevent scintillation light from leaking from the columnar crystals 30. As a result, it is possible to improve a resolution and an optical output.

The protective layer 5 is fixed to the frame member 4 which is higher (thicker) than the scintillator layer 3. Accordingly, for example, by using the protective layer 5 having a flat plate shape, a space formed by a difference in the height between the frame member 4 and the scintillator layer 3 is formed between the scintillator layer 3 and the protective layer 5. Accordingly, by disposing the optical functional layer 6 and the elastic member 7 in the space, it is possible to easily and satisfactorily realize the above-mentioned configuration and thus to improve a resolution and an optical output.

With the radiation detector 1D, the following other advantages can be achieved. That is, the radiation detector 1D is configured by forming the scintillator layer 3 directly on the substrate 2D (and the film portion 11) serving as the sensor panel, for example, by deposition. Accordingly, when the radiation detector is constructed, the sensor panel and the scintillator panel which have been prepared separately do not need to be bonded to each other. In the scintillator panels 1, 1A, and 1C, radiation detectors may be constructed by separately disposing a sensor panel on the opposite surface of the principal surface 2s of the substrate 2.

The radiation detector 1D may include the scintillator layer 3A or the scintillator layer 3B instead of the scintillator layer 3. In the radiation detector 1D, the elastic member 7 may be integrated with the optical functional layer 6 as in the scintillator panel 1 or may be integrated with the protective layer 5 as in the scintillator panel 1A. A radiation detector may be constructed by replacing the substrate 2 of the scintillator panel 1C with the substrate 2D. In this case, the radiation detector includes a hard optical functional layer 9 which is integrally formed with the surface 5s of the protective layer 5 facing the scintillator layer 3 instead of the optical functional layer 6 and does not include the elastic member 7.

INDUSTRIAL APPLICABILITY

It is possible to provide a scintillator panel and a radiation detector that can improve a resolution and an optical output.

REFERENCE SIGNS LIST 1, 1A, 1C Scintillator panel
1D Radiation detector
2, 2D Substrate
2s Principal surface
3, 3A, 3B Scintillator layer
4 Frame member
5 Protective layer
5s Surface
6 Optical functional layer
7 Elastic member
9 Optical functional layer
10 Photoelectric conversion element
30, 30A, 30B Columnar crystal
30t Tip
R Radiation
H3, H4 Height

The invention claimed is:

1. A scintillator panel for converting radiation into scintillation light, the scintillator panel comprising:
a substrate including a principal surface and having transparency with respect to the scintillation light;
a scintillator layer disposed on the principal surface;
a frame member disposed on the principal surface so as to surround the scintillator layer when viewed in a direction intersecting the principal surface;
a protective layer disposed on the principal surface and the scintillator layer and fixed to the frame member so as to seal the scintillator layer;
a sheet-shaped optical functional layer disposed between the scintillator layer and the protective layer; and
an elastic member interposed between the optical functional layer and the protective layer and elastically deformed,
wherein a height of the frame member from the principal surface is larger than a height of the scintillator layer from the principal surface,
wherein the scintillator layer includes a plurality of columnar crystals of a scintillator material, and
wherein the optical functional layer is pressed to the scintillator layer by an elastic force of the elastic member and comes in contact with the scintillator layer in a plurality of regions including tips of the plurality of columnar crystals.

2. The scintillator panel according to claim 1, wherein the elastic member has a sheet shape extending along the principal surface.

3. The scintillator panel according to claim 2, wherein the elastic member includes foamed plastics.

4. The scintillator panel according to claim 1, wherein the elastic member is formed integrally with the optical functional layer or the protective layer.

5. The scintillator panel according to claim 1, wherein the tip of each columnar crystal is flattened.

6. A radiation detector comprising:
a substrate including a principal surface and a plurality of photoelectric conversion elements formed on the principal surface;
a scintillator layer disposed on the photoelectric conversion elements for converting radiation into scintillation light;
a frame member disposed on the principal surface so as to surround the scintillator layer when viewed in a direction intersecting the principal surface;
a protective layer disposed on the principal surface and the scintillator layer and fixed to the frame member so as to seal the scintillator layer;
a sheet-shaped optical functional layer disposed between the scintillator layer and the protective layer; and
an elastic member interposed between the optical functional layer and the protective layer and elastically deformed,
wherein a height of the frame member from the principal surface is larger than a height of the scintillator layer from the principal surface,
wherein the scintillator layer includes a plurality of columnar crystals of a scintillator material, and
wherein the optical functional layer is pressed to the scintillator layer by an elastic force of the elastic member and comes in contact with the scintillator layer in a plurality of regions including tips of the plurality of columnar crystals.

7. The radiation detector according to claim 6, wherein the elastic member has a sheet shape extending along the principal surface.

8. The radiation detector according to claim 7, wherein the elastic member includes foamed plastics.

9. The radiation detector according to claim 6, wherein the elastic member is formed integrally with the optical functional layer or the protective layer.

10. The radiation detector according to claim 6, wherein the tip of each columnar crystal is flattened.

11. A scintillator panel for converting radiation into scintillation light, the scintillator panel comprising:
a substrate including a principal surface and having transparency with respect to the scintillation light;
a scintillator layer disposed on the principal surface;
a frame member disposed on the principal surface so as to surround the scintillator layer when viewed in a direction intersecting the principal surface;
a protective layer disposed on the principal surface and the scintillator layer and fixed to the frame member so as to seal the scintillator layer; and
a hard optical functional layer formed integrally on a surface of the protective layer facing the scintillator layer,
wherein a height of the frame member from the principal surface is larger than a height of the scintillator layer from the principal surface,
wherein the scintillator layer includes a plurality of columnar crystals of a scintillator material, and
wherein the optical functional layer is pressed to the scintillator layer in a state where the protective layer is fixed to the frame member and comes in contact with the scintillator layer in a plurality of regions including tips of the plurality of columnar crystals.

12. A radiation detector comprising:
a substrate including a principal surface and a plurality of photoelectric conversion elements formed on the principal surface;
a scintillator layer disposed on the photoelectric conversion elements for converting radiation into scintillation light;
a frame member disposed on the principal surface so as to surround the scintillator layer when viewed in a direction intersecting the principal surface;
a protective layer disposed on the principal surface and the scintillator layer and fixed to the frame member so as to seal the scintillator layer; and
a hard optical functional layer formed integrally on a surface of the protective layer facing the scintillator layer,
wherein a height of the frame member from the principal surface is larger than a height of the scintillator layer from the principal surface,
wherein the scintillator layer includes a plurality of columnar crystals of a scintillator material, and
wherein the optical functional layer is pressed to the scintillator layer in a state where the protective layer is fixed to the frame member and comes in contact with the scintillator layer in a plurality of regions including tips of the plurality of columnar crystals.

13. The radiation detector according to claim 7, wherein the elastic member is formed integrally with the optical functional layer or the protective layer.

14. The radiation detector according to claim 8, wherein the elastic member is formed integrally with the optical functional layer or the protective layer.

15. The radiation detector according to claim 7, wherein the tip of each columnar crystal is flattened.

16. The radiation detector according to claim 8, wherein the tip of each columnar crystal is flattened.

17. The radiation detector according to claim 9, wherein the tip of each columnar crystal is flattened.

18. The radiation detector according to claim 13, wherein the tip of each columnar crystal is flattened.

19. The radiation detector according to claim 14, wherein the tip of each columnar crystal is flattened.

* * * * *